Sept. 2, 1947.        A. W. JAROSZ        2,426,933
MICROMETER HEIGHT GAGE
Filed Oct. 2, 1944
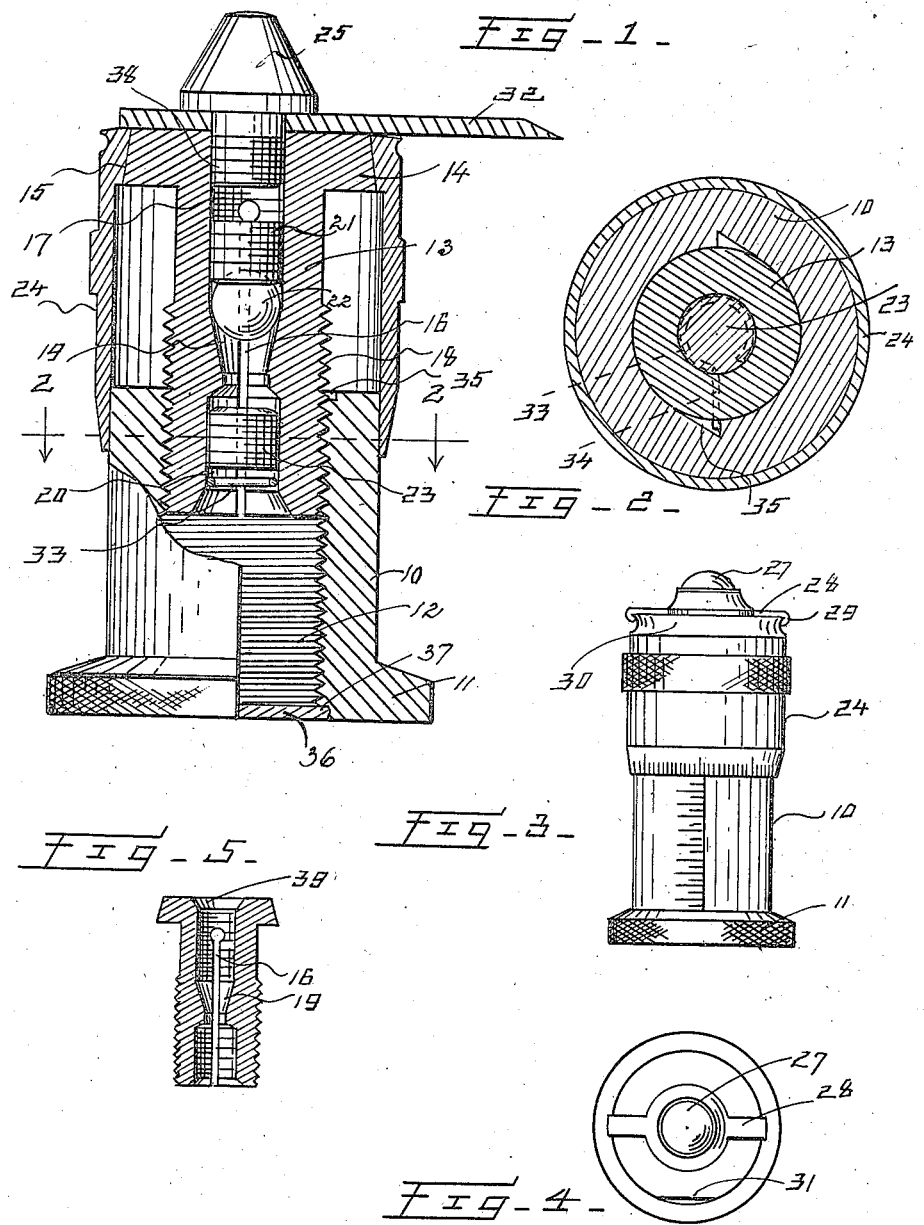
INVENTOR.
ALBERT W. JAROSZ
BY
Louis Chayka
Attorney Patented Sept. 2, 1947

2,426,933

UNITED STATES PATENT OFFICE 2,426,933

MICROMETER HEIGHT GAGE

Albert W. Jarosz, Detroit, Mich.

Application October 2, 1944, Serial No. 556,844

4 Claims. (Cl. 33—170)

The gage is of the type which comprises a cylindrical barrel having an axially disposed threaded bore, a micrometer screw within said bore, and a thimble supported by said screw and skirting the barrel.

The purpose of my invention is to provide a gage having simple but effective means for compensating for the wear of the threads both within the barrel and on the micrometer screw, said means also serving to prevent any play or looseness of contact between the respective co-operative elements.

Another purpose of my invention is to extend the range of useful application of my gage by means of auxiliary members, in excess of the limits to which the gage would be otherwise restricted.

Another purpose of my invention is to provide a gage which in some cases, may be used as a lifting jack to raise objects to a predetermined height.

I shall now describe my invention with reference to the accompanying drawings, in which:

Fig. 1 is a vertical sectional view of my improved gage.

Fig. 2 is a sectional view of my gage taken on line 2—2 of Fig. 1.

Fig. 3 is a side elevation in reduced size, of my gage.

Fig. 4 is a top view of my gage shown in Fig. 3.

Fig. 5 is a sectional view of a micrometer screw, in reduced size, being a part of my gage.

Similar numerals refer to similar parts throughout the several views.

The gage comprises a cylindrical barrel 10, resting on base 11, and threaded internally as shown by numeral 12, a tubular micrometer screw 13 within said barrel, and a thimble 24 seated on top of said screw.

The ordinary micrometer gage calls for a screw having forty threads to an inch, while a thimble which is employed in conjunction therewith has twenty-five calibrations on its outer circumference. I wish to point out that the micrometer screw in my gage has only twenty threads to an inch, while the calibrations on the thimble have been increased to fifty. The final result, as far as gaging is concerned, is the same, the gage being capable of indicating measurements to one thousandth of an inch, but the threads are sturdier, so much so that the gage may be used as a lifting jack to support objects like dies to raise them to a particular critical height.

The micrometer screw 13 includes a transverse head 14 having sloping sides 15. The body of the screw is threaded on the outside, as shown by numeral 18, and is provided with an axial aperture running throughout the length of said screw, the aperture being threaded in its upper portion 17, also at its lower portion 20, but having a mid-section 19 of reduced diameter and tapered downwardly. In addition thereto, the body of the screw is provided with a plurality of longitudinal slots 16 running parallel to the axis of the body of the screw.

The micrometer screw, when completed, is made in such a manner that the parts of its body, split by said slots 16, flare outwardly so that in effect the outer diameter of the screw is a little larger at the bottom than it is in its mid-section. When about to be inserted into the barrel, these parts split by the slots have to be squeezed to fit into said barrel. As a result thereof, the looseness of contact between the inner wall of the barrel and the outer wall of the micrometer screw is eliminated.

Disposed within said micrometer screw in its upper threaded section 17 is a short screw 21 of the so-called Phillip's type, with a recessed head therein, the bottom of the screw bearing against a ball 22 seated within the tapered aperture 19. A similar screw 23, its head opening downwardly, is located in the lower inner section 20 of said micrometer screw and is of a slightly larger diameter than the diameter of said section 20. The purpose of said screw is to serve as a means of locking the micrometer screw in place with respect to the barrel, while the upper screw 21, in conjunction with the ball 22, serves as a means to expand the micrometer screw to compensate for any wear of its outer threads or the inner threads of the barrel in which said micrometer screw 13 is seated. As the barrel 10 is open from the bottom and said micrometer screw is open from the top, both adjusting screws 21 and 23 are easily accessible and may be turned in or out, as the case may be, by means of a suitable screw driver.

It must be observed in this connection that although the lower crew 23 may be disposed entirely within the lower threaded section 20 of the micrometer screw, it is capable of expanding said micrometer screw by being turned inwardly because said micrometer screw is not split by slots 16 the whole length of the screw but only a part of it, as shown in Fig. 5.

The thimble 24, which is a material part of my gage, has a circular opening in its top adapted to abut the sloping sides 15 of the transverse head 14 of the micrometer screw 13, and is frictionally retained in place on said head.

The micrometer gage described by me is for general purposes used in the same manner as other gages of the same type, with this exception, however, that said screws 21 and 23 afford easily accessible means to lock the gage at a desirable height by means of said screw 23, or to compensate for the wear of the respective threads of the micrometer screw or the barrel by means of screw 21 and ball 22.

I wish to state at this point that the construction of my micrometer gage is such that its use may be extended for purposes for which ordinary gages are not suitable. For instance, the upper end of the micrometer screw may be used to receive a tip 25, having a threaded stem 38, which fits into the threaded axial aperture of screw 13. The tip is in the form of a 60-degree truncated cone, except that the top surface may be curved outwardly, and is particularly adapted to fit into center holes of objects worked in lathes, also into V-blocks. The tip employed with my gage serves to extend its usefulness so as to insure accuracy of measurement in cases in which a flat top surface would not be satisfactory or could not be used at all. As an example, I may cite the gaging of a distance between a round shaft and a rim of a wheel mounted thereon. This may be easily accomplished with the aid of my gage equipped with said tip, by placing the base of my gage on the shaft so that the tip, when raised with the thimble, may come into contact with the rim of the wheel. In practice, the base would be placed on the shaft, the base being held tangentially towards the shaft so that the extended radius of the shaft would pass through the axis of my gage to the end of the tip.

In case the distance to be measured exceeds the capacity of the gage, a rod of definite length, threaded at one end, to be secured within the upper end of the micrometer screw, may be employed. If desired, a ball 27 may be employed in place of the tip 25 and it may be secured in place by a yoke 28 having grippers 29 bent inwardly. In order that the yoke may be employed, the upper end of the thimble is provided with a groove 30. On one side the upper flange of the groove is cut off as shown by numeral 31 in Fig. 4. This allows the mounting of the yoke when desired. The ball, when employed, rests in the outwardly flaring axial opening 39 at the top of the micrometer screw, shown in Fig. 5. With respect to said opening 39 the micrometer screw shown in Fig. 5 is a modification of the micrometer screw shown in Fig. 1. It will be understood that my micrometer gage may be also employed in conjunction with a scriber, such a scriber being indicated by numeral 32.

In order to prevent the micrometer screw from being entirely withdrawn from the barrel, I am employing a resilient member 33 coiled within the lower section 29 of the micrometer screw and having an arm 34 extending radially out of said screw into an indentation 35 in barrel 10 on its inner side and close to its top. As the device is already well known, it will not need any further description.

By way of full explanation of the drawings, I wish to add that numeral 36 indicates a disc of such material as cardboard or leather, fitting into a recess 37 at the lower end of the barrel, to prevent dust from entering said barrel.

It will be seen that some changes may be made in my micrometer gage without deviating from the inventive principle disclosed herein.

What I, therefore, wish to claim is as follows:

1. A micrometer height gage of the kind described, comprising a calibrated cylindrical barrel having a threaded axial bore, a tubular micrometer screw operatively disposed within said bore and being split longitudinally by a plurality of slots extending substantially the whole of its length, the inner bore of the micrometer screw being constricted substantially midway its length, a ball within said bore resting partly in the constricted section of the micrometer screw, a short screw within said bore being against the ball from above, a short screw within the bore, below the constricted section and being of slightly larger diameter than the inner bore of the micrometer screw, and a calibrated thimble skirting said barrel and supported by the upper end of the micrometer screw.

2. A micrometer height gage, comprising a cylindrical calibrated barrel provided with a threaded axial bore, a tubular micrometer screw within the bore, said micrometer screw being split longitudinally by a plurality of slots substantially the whole of its length and having midway its length a funnel-like passage of reduced diameter, a ball within the passage bearing against its sides, a short screw within the micrometer screw, bearing against the top of the ball and serving to expand said micrometer screw by means of said ball, a short screw within the micrometer screw, but below the constricted passage, said short screw being of a diameter in excess of that of the inner bore of the micrometer screw and serving to expand said last named screw to lock it against rotation, and a calibrated thimble seated on top of said micrometer screw and skirting said calibrated barrel.

3. A height gage comprising a calibrated barrel, a hollow micrometer screw axially disposed within said barrel and split longitudinally the major part of its length by a plurality of spaced slots, said micrometer screw having in its upper part a threaded inner bore bearing downwardly from above, and in its lower part a threaded bore leading upwardly, a funnel-like passage substantially midway the length of the micrometer screw, a ball partly within the funnel-like passage, a short screw in the upper bore bearing against the ball, and a short screw in the lower bore but of a diameter slightly in excess of said bore, and a calibrated thimble seated on said micrometer screw and skirting the barrel.

4. A micrometer screw for height gages of the kind described, comprising a hollow cylinder split longitudinally from the bottom the major part of the length of said screw by a plurality of spaced slots and including, substantially midway its length, a funnel like passage tapering downwardly, a movable member within said passage adapted to be wedged in to expand the screw radially, said micrometer screw having in its upper part a threaded inner bore leading downwardly, and a short screw therein bearing from above against said movable member, while the inner surface of the lower part of the micrometer screw is provided with a thread leading upwardly, and a short screw therein, its diameter being in excess of the normal inner diameter of the micrometer screw at the lower end.

ALBERT W. JAROSZ.

REFERENCES CITED

The following references are of record in the file of this patent:

UNITED STATES PATENTS

| Number | Name | Date |
| --- | --- | --- |
| 2,338,001 | LaVigne | Dec. 28, 1943 |
| 1,307,816 | Garbin | June 24, 1919 |
| 438,504 | Stupakoff | Oct. 14, 1890 |